United States Patent
Hirzalla et al.

(10) Patent No.: US 6,415,000 B1
(45) Date of Patent: Jul. 2, 2002

(54) METHOD OF PROCESSING A VIDEO STREAM

(75) Inventors: Nael Hirzalla, Austin, TX (US); Paul Streatch, Richmond (CA); Roger MacLean; Rob Menard, both of Nepean (CA)

(73) Assignee: March Networks Corporation, Kanata (*) Notice: Subject to any disclaimer, the term of this patent is extended or adjusted under 35 U.S.C. 154(b) by 0 days.

(21) Appl. No.: 09/308,266
(22) PCT Filed: Nov. 20, 1997
(86) PCT No.: PCT/CA97/00881
 § 371 (c)(1),
 (2), (4) Date: Jul. 9, 1999
(87) PCT Pub. No.: WO98/23085
 PCT Pub. Date: May 28, 1998

(30) Foreign Application Priority Data

Nov. 20, 1996 (CA) .............................................. 2190785

(51) Int. Cl.⁷ ............................................... H04N 7/18
(52) U.S. Cl. .................................. 375/240.29; 348/155
(58) Field of Search ..................... 375/240.29; 348/699, 348/700, 155–160

(56) References Cited

U.S. PATENT DOCUMENTS 5,801,765 A * 9/1998 Gotoh et al. ................ 348/155
5,970,180 A * 10/1999 Niihara et al. .............. 382/261

* cited by examiner

Primary Examiner—Andy Rao
(74) Attorney, Agent, or Firm—Marks & Clerk

(57) ABSTRACT

A method of processing a video stream, involves contemporaneously selecting first and second pairs of frames in the video stream with a predetermined period. The second pairs of frames have a longer period than the first pair. For each of the first and second pairs of frames, there is determined a difference value representing the number of pixels whose value has changed between the first and second frames of the pair. A particular logic level is generated depending on whether this difference value exceeds a predetermined threshold. The generated logic levels are then compared with a decision map to identify cuts in the video stream

18 Claims, 5 Drawing Sheets

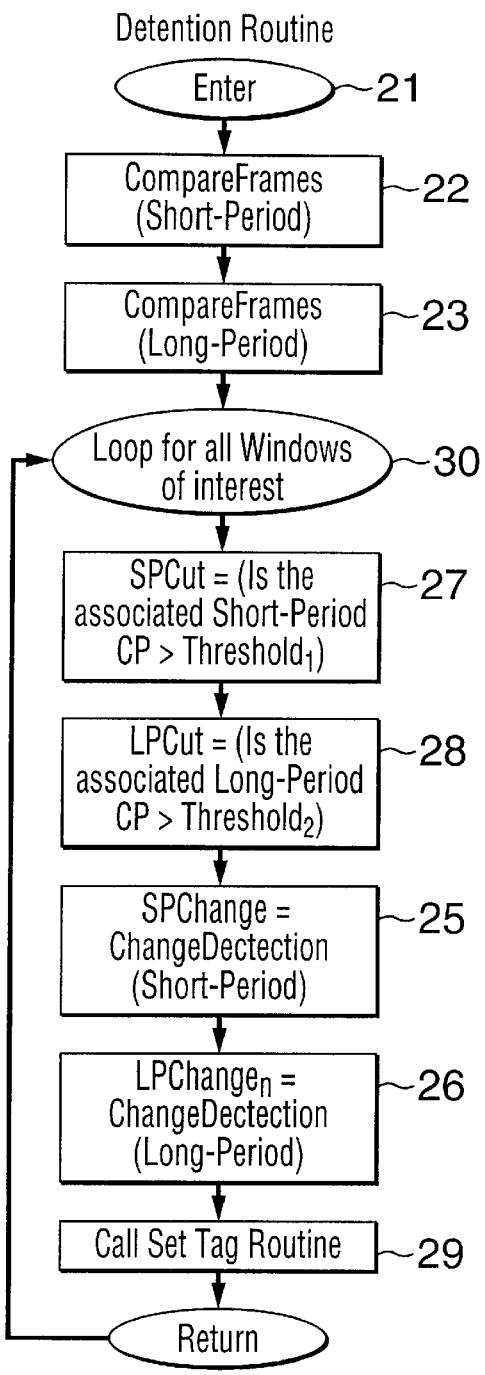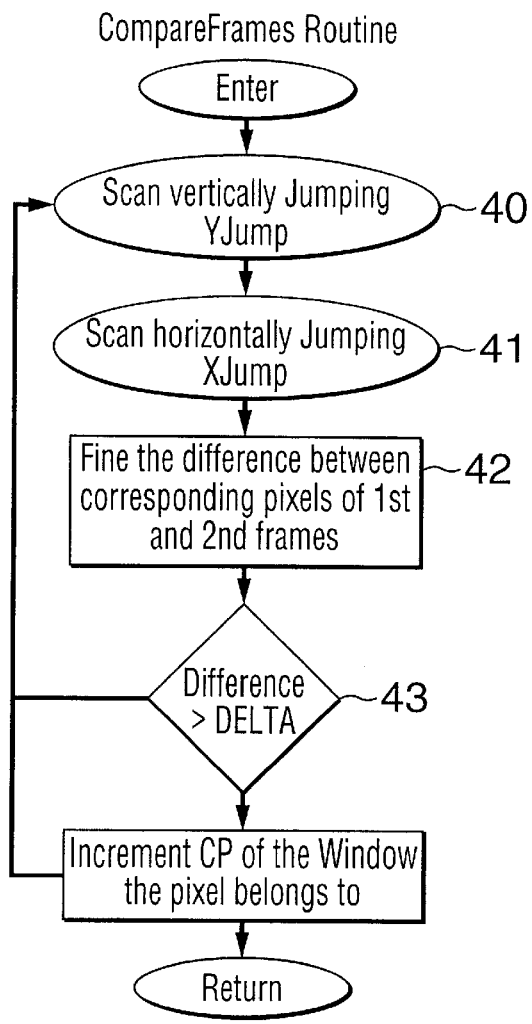
FIG. 3
FIG. 4

METHOD OF PROCESSING A VIDEO STREAM

This invention relates to a method of processing a video stream, to detect changes, for example, a cut in scenes.

In video terminology, a video stream consists of a number of frames that are displayed successively to create the illusion of motion. A sequence of frames can be considered to form a "scene", which is considered to be a continuous action in space and time (i.e. with no camera breaks). A "cut" is a discontinuity between scenes. A cut is sharp if it can be located between two frames and gradual if it takes place over a sequence of frames. A keyframe is a frame that represents a whole scene. It can either be calculated or selected from the frames of the scene it represents.

There are many situations where it is desirable to select a cut. For example, selecting keyframes to transmit over a network, save onto a hard disk, or use to browse a video can reduce bandwidth, capacity and time than considering the whole video data. However, video segmentation is a difficult process in view of the various types of camera breaks and different operations that can take place.

Video parameters include intensity, red-green-blue (RGB), hue-value-chroma (HVC), and a motion vector. A traditional approach for detecting a cut is to compare one or more of these parameters, such as intensity, of the corresponding pixels in a pair of consecutive frames. If the number of pixels whose intensity values have changed from one frame to the next exceeds a certain threshold, a cut is presumed. However, such an approach results in low detection rates and result in the detection of false cuts or missing real cuts. False cuts may result from camera operations, object movements or flashes within a video clip, while missed cuts may result from gradual scene changes.

EP 696 01 6A describes a cut detection method wherein a scene changing ratio is computed taking into account the frame difference between temporally spaced images as well as temporally successive images. EP 660327 describes a method for detecting abrupt and gradual scene changes wherein matching is performed between a current frame and a $D^{th}$ previous frame. Neither of these patents satisfactorily solves the problems outlined above.

An object of the invention is to alleviate the aforementioned problems.

According to the present invention there is provided a method of processing a video stream, comprising the steps of selecting first pairs of frames in the video stream with a predetermined temporal spacing; selecting second pairs of frames in the video stream, said second pairs of frames having a longer temporal spacing than said first pairs of frames; for each of said first and second pairs of frames, determining a difference value representing the degree of change between the first and second frames of the pair and generating a particular logic level depending on whether this difference value exceeds a predetermined threshold; determining the change in interframe difference value for successive pairs of frames for each of said first and second pairs of frames and comparing said change with a threshold to generate additional logic levels dependent on the change in interframe difference values for said successive frame pairs; and comparing the generated logic levels are compared with a decision map to identify cuts in the video stream.

The degree of change may be represented by the number of pixels for which a particular value, such as intensity, has changed. Alternatively, the difference value may be arrived at by, for example, taking the root mean square of the differences in pixel values. In this case, the difference in intensity value of each corresponding pair of pixels is determined, the results squared, and the square root taken of the sum. This rms value can then be compared to a threshold. A value other than intensity, for example hue, can be chosen for the value.

By this method, gradual cuts between scenes can be more accurately detected and the occurrence of false detections can be reduced.

In a preferred embodiment, the change in difference value between each of the first and second pairs of frames and the corresponding previous pairs is determined, and additional logic levels are generated that depend on whether the change in difference values exceeds a predetermined threshold. The additional logic levels are also compared with the decision map to assist in identifying the cuts. This additional step enhances the detection process.

The invention also provides video processing apparatus comprising means for selecting first pairs of frames in the video stream with a predetermined temporal spacing; means for selecting second pairs of frames in the video stream, said second pairs of frames having a longer temporal spacing than said first pairs of frames; means for determining, for each of said first and second pairs of frames, a difference value representing the degree of change between the first and second frames of the pair and generating a particular logic level depending on whether this difference value exceeds a predetermined threshold; characterized in that it further comprises means for computing the change in interframe difference value for successive pairs of frames for each of said first and second pairs of frames and comparing said change with a threshold to generate additional logic levels dependent on the change in interframe difference values for said successive frame pairs, and means for comparing the generated logic levels with a decision map to identify cuts in the video stream.

The invention will now be described in more detail, by way of example, only with reference to the accompanying drawings, in which:

FIG. 3 illustrates the detection processing routine;

FIG. 4 illustrates the compare frames processing routine;

Figure 1:
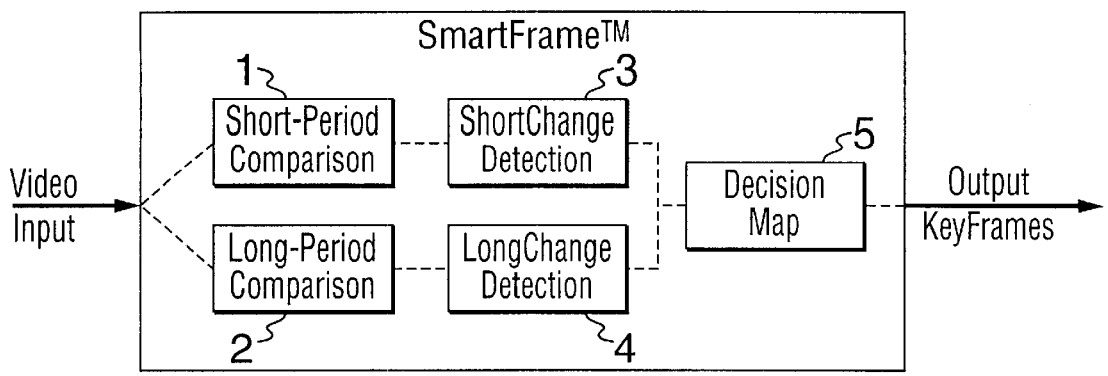
FIG. 1 is a block diagram of an apparatus for detecting cuts in a video stream.

The system illustrated is typically implemented on a Pentium 133 MHz computer. A digital video stream, for example, from a digital video camera or an analog feed passed through an analog-to-digital converter (not shown), is split and passed to short and long period units 1, 2. The short period comparison unit identifies a pair of frames in a stream, for example, the fourth and fifth frames, and determines the number of pixels whose values have changed. This number is then compared with a threshold and allocated a logic level 1 if it exceeds the threshold and otherwise a logic level 0. The pixel values can be any suitable value, but typically the intensity is used.

The long period comparison unit 2 carries out the same operation, except on pairs of frames that are temporally further apart, for example, first and eighth frames in the video stream. It generates a logical 1 if the number of pixels whose intensity values have changed exceeds a predetermined threshold. Otherwise it generates a logical 0.

The video stream is then passed to the short period change detection unit 3 and the long period change detection unit 4. The short period change detection unit 3 compares the current interframe difference value, derived in unit 1, namely the number of pixels whose intensity values have changed between each pair of pixels, with the previous pair, or the average of all the previous pairs, of interframe difference values to derive the change. If the change in interframe difference values exceeds a predetermined threshold, a logical 1 is generated, otherwise a logical 0 is generated.

The long period change detection unit 4 does the same as the short period change detection unit, except with frames separated by a longer period, the first and eighth frames in this example. The threshold for the long period change detection unit is typically higher than for the short period detection unit.

A decision map shown below is stored in unit 5.

| Short-Change | Short-Period Cut | Long-Change | Long-Period Cut | Type of Change | Cut? |
|---|---|---|---|---|---|
| 0 | X | X | 0 | — | No |
| X | X | 0 | 1 | Action | No |
| X | 0 | 1 | 1 | Gradual | Yes |
| 0 | 1 | 1 | 1 | Action | No |
| 1 | X | X | 0 | Flashes | No |
| 1 | 1 | 1 | 1 | Sharp | Yes |

This contains a table of all possible values of the logic outputs of units 1 to 4, logic level 0 representing a comparison below the threshold, logic 1 being a comparison above the threshold and X, where X means "don't care". i.e. 0 or 1. For example, in the short change column, a 1 means that unit 3 detects a change in difference values between successive pairs of frames above a threshold, 0 means any change was below the threshold, and X means that the outcome of the short change comparison is not relevant to the decision.

The system shown in FIG. 1 moves through successive frames as follows. For example, if the system processes six frames at a time, frames 1 and 6 would form the long pair and frames 3 and 4 might form the short pair. If no cuts are detected in this block, the next block will be made of frames 2 to 7, with frames 2 and 7 forming the long pair, and frames 4 and 5 forming the short pair and so on. However, if a cut is detected, the next block will contain frames 6 to 11 since the block size is very small compared to a typical scene length and no two cuts can be detected within one block.

On looking at the table above, it will be observed that a positive result for all four comparisons indicates a true sharp cut, whereas a positive result in the long change and long period detector without a corresponding result in the short period detector indicates a probable gradual cut.

A frame may contain one or more windows to which the above described process can be applied. The use of windows allows the system to focus on specific areas of a frame instead of considering the frame as a whole. This can save considerable processing time.

Figure 2:
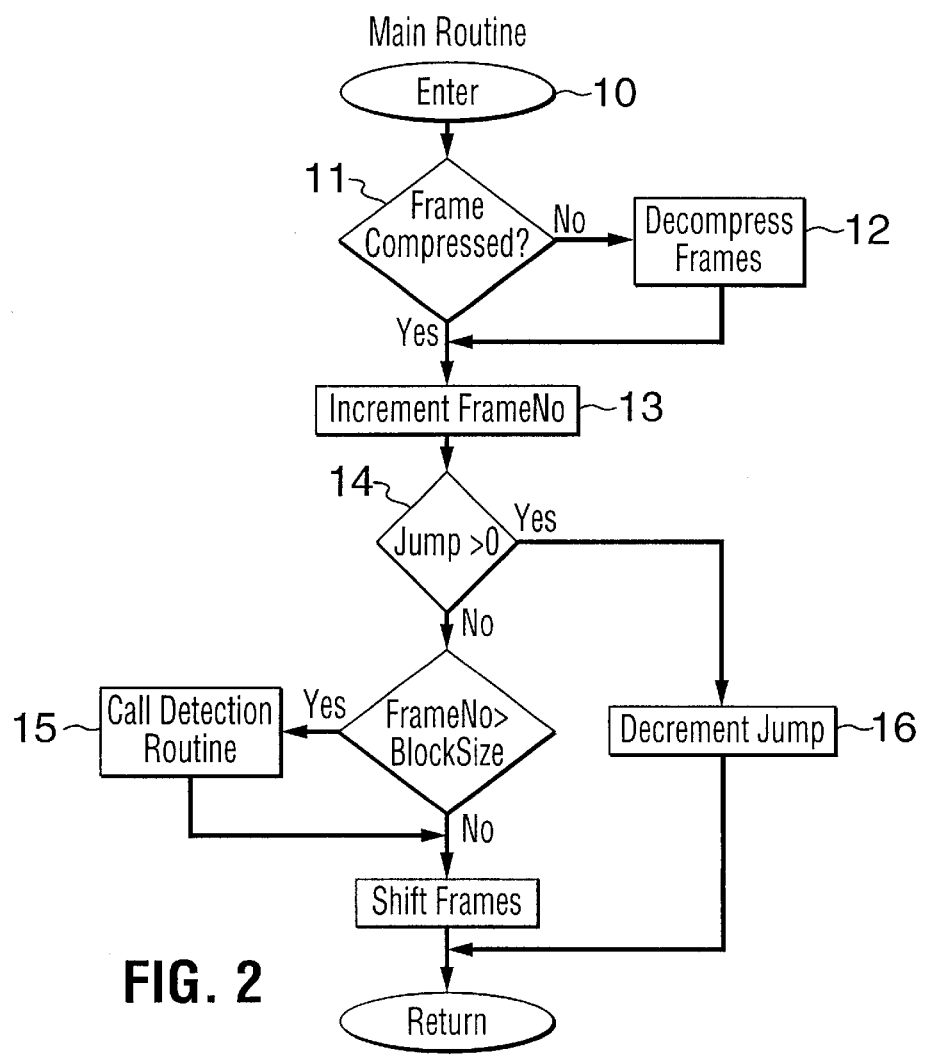
FIG. 2 illustrates the main processing routine.

The main processing routine is shown in FIG. 2. Starting at block 10, the routine determines at process block 11 whether the frame is decompressed. If not, it is decompressed in process block 12. At process block 13, the frame number is incremented. Decision block 14 determines whether variable jump (set in the Tag routine to be described) is greater than 0 and the number of sectors is greater than 1. If not, and the FrameNo variable is greater than the Blocksize variable, block 15 calls the call detection routine shown in FIG. 3. If the output of Decision block 14 is true, block 16 decrements the jump variable.

FIG. 3 shows the cut detection routine. Starting from process block 21, block 22 performs the short frame comparison and block 23 performs the long frame comparison to determine the number of pixels whose intensity values have changed for each pair frames.

Process blocks 27, 28 determine whether the percentage change is above the threshold for the associated window, and if so generate a logical 1, otherwise they generate a logical zero.

Process blocks 25 and 26 perform the short and long change detection operations following which block 29 calls the set tag routine described with reference to FIG. 4. Process block 30 causes the routine to loop for all windows of interest assuming the system is operating on the basis that there is more than one window. Of course, there could only be one window that represents a whole frame.

FIG. 4 shows the compare frames routine in more detail. Processing blocks 40, 41 loop for all the pixels in a row and column respectively. Block 42 then finds the differences between the corresponding pixels in the first and second frames of each pair. If the decision unit 43 finds a difference greater than a threshold, the CP variable, which represents the percentage change of the window containing the pixels is incremented.

Figure 5:
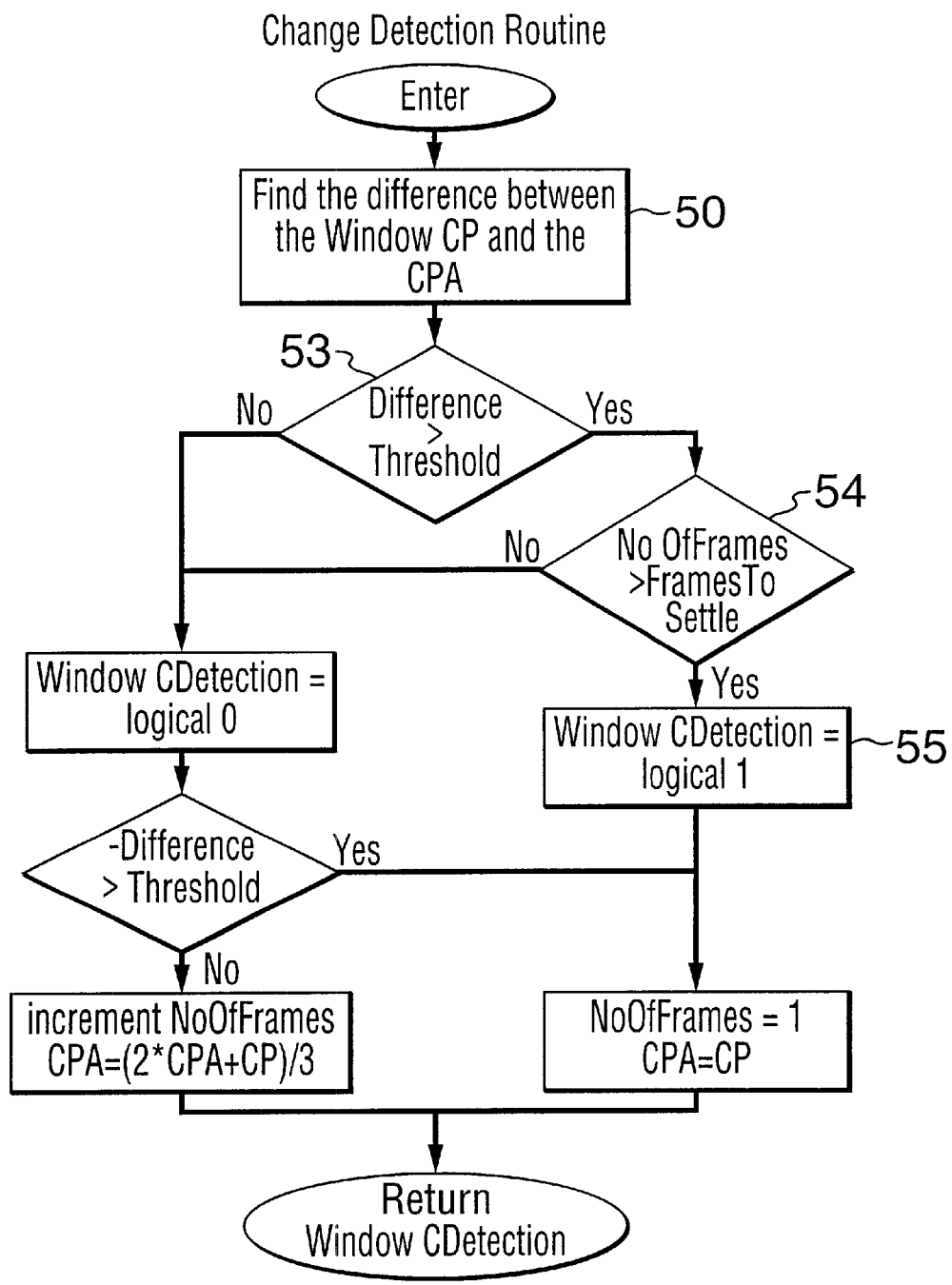
FIG. 5 illustrates the change detection routine.

FIG. 5 shows the change detection routine identified in blocks 25, 26 in FIG. 3 in more detail. Block 50 finds the difference between the change period CP for the window and the average change period CPA. If this change is greater than a threshold, as determined in decision unit 53, and the condition in block 54 is met, process block 55 sets the output to logical 1 to indicate a change. The change detection routine shown in FIG. 5 works for both long period and short period changes.

Figure 6:
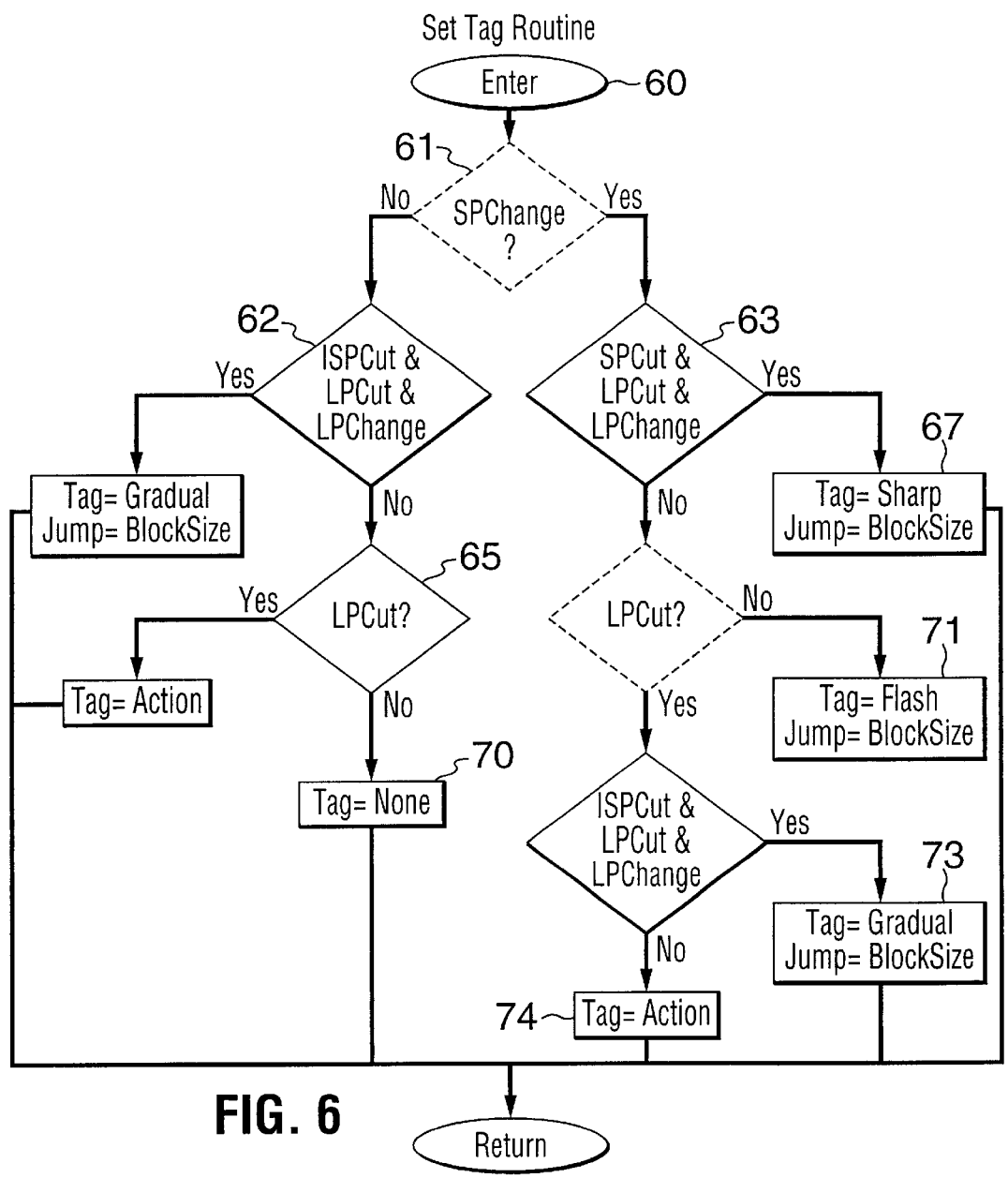
FIG. 6 illustrates the set tag routine.
Figure 7:
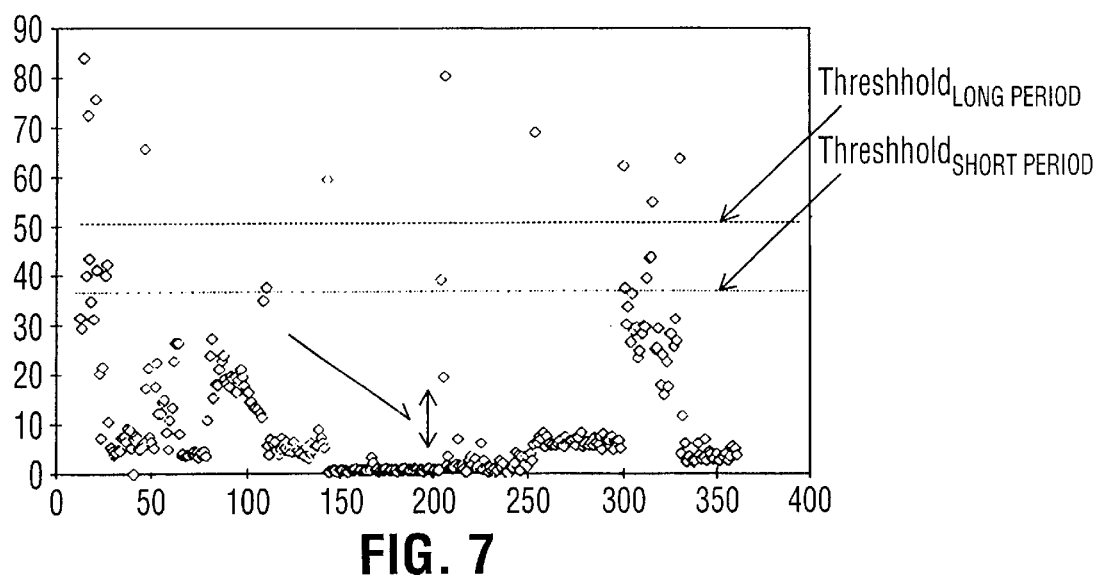
FIG. 7 shows typical threshold values.

Referring now to FIG. 6, the tag routine essentially implements the decision map table shown in FIG. 7. Starting from process block 60 called by process block 29 in FIG. 3, the routine determines whether there has been a short period change in block 61. If yes, decision block 63 determines whether there has been a short period cut, long period cut, and long period change. If yes, the block 67 creates a cut tag. If no, the block 68 determines whether there has been long period cut. If yes, block 71 creates a flash tag.

If the result of decision block 68 is true, block you checks the condition ISPcut, and LPcut and LPchange is met, where ISPcut means that the SPcut variable is logical 0 or in other words no cut was detected in the short period. If yes, block 73 creates a cut tag If no, block 74 creates an action tag.

If the result of decision block 61 is no, decision block 62 determines whether the condition !SPcut and LPcut and Lpchange has been met. If yes, block 64 creates a cut tag and sets the variable jump equal to the block size. If no, block 65 determines whether there has been an LP cut. If no, block 70 creates a no cut tag; if yes, block 74 creates an action tag.

The program then moves on to a following block of frames to repeat the process, continually creating tags identifying cuts and indicating whether a cut has been detected in the processed block.

FIG. 7 shows typical short-period interframe difference values expressed as a percentage vs. Frame number. Although Threshsold$_{LONGPERIOD}$ is applied on the corresponding long-term chart, it is shown in this figure as well.

The described method has many uses. For example, it can be applied to scene change detection with automatic cut detection and flagging, visual index creation for videos, video transformation from video to pictorial transcripts and illustrated audio, video sequence recognition, motion detection, motion tracking and sizing, and bandwidth reduction by extracting only changing information from a scene.

The described method can achieve a high and robust video cut detection rate in part due to the change detection routine, satisfy real-time requirements. It can easily be applied only to specific windows of interest within a frame in the manner described. It can be applied to automatic television monitoring and be situated either at the network access point or at the user end. It can also be integrated with any database management system that needs to index or store video.

What is claimed is:

1. A method of processing a video stream, comprising the steps of:

selecting first pairs of frames in the video stream with a predetermined temporal spacing;

selecting second pairs of frames in the video stream, said second pairs of frames having a longer temporal spacing than said first pairs of frames;

for each of said first and second pairs of frames, determining a difference value representing the degree of change between the first and second frames of the pair and generating a particular logic level depending on whether this difference value exceeds a predetermined threshold;

determining the change in interframe difference value for successive pairs of frames for each of said first and second pairs of frames and comparing said change with a threshold to generate additional logic levels dependent on the change in interframe difference values for said successive frame pairs; and comparing the generated logic levels with a decision may to identify cuts in the video stream.

2. A method as claimed in claim 1, wherein the degree of change between frames of a pair is represented by the number of pixels for which a value has changed.

3. A method as claimed in claim 1, wherein said threshold is different for each of said first and second pairs of frames.

4. A method as claimed in claim 3, wherein said change in interframe difference value is determined by comparing the interframe difference for the current pair of frames with the average interframe difference for previous pairs of frames.

5. A method as claimed in claim 3, wherein said change in interframe difference value is determined by comparing the interframe difference for the current first or second pair of frames with the interframe difference for the respective previous first or second pair of frames.

6. A method as claimed in claim 1, wherein said value is the pixel intensity.

7. A method as claimed in claim 1, wherein said frames are divided into at least one window and said processing steps are carried out within a selected window.

8. A method of detecting scene changes in a video stream comprising detecting cuts by a method as claimed in claim 1.

9. A method of creating a video index which includes detecting cuts by a method as claimed in claim 1.

10. A method of transforming from video to pictorial transcripts which includes detecting cuts by a method as claimed in claim 1.

11. A method of recognizing video sequences which includes detecting cuts by a method as claimed in claim 1.

12. A method of motion detection which includes detecting cuts by a method as claimed in claim 1.

13. A method of motion tracking which includes detecting cuts by a method as claimed in claim 1.

14. A method of bandwidth reduction which includes detecting cuts by a method as claimed in claim 1.

15. Video processing apparatus comprising:

means for selecting first pairs of frames in the video stream with a predetermined temporal spacing;

means for selecting second pairs of frames in the video streams said second pairs of frames having a longer temporal spacing than said first pairs of frames;

means for determining, for each of said first and second pairs of frames, a difference value representing the degree of change between the first and second frames of the pair and generating a particular logic level depending on whether this difference value exceeds a predetermined threshold;

means for computing the change in interframe difference value for successive pairs of frames for each of said first and second pairs of frames and comparing said change with a threshold to generate additional logic levels dependent on the change in interframe difference values for said successive frame pairs; and means for comparing the generated logic levels with a decision map to identify cuts in the video strewn.

16. Video processing apparatus as claimed in claim 15, wherein said determining means determines the number of pixels for which a value has changed.

17. Video processing apparatus as claimed in claim 15, characterized in that said means for computing the change in interframe difference value compares the interframe difference for the current pair of frames with the average interframe difference for previous pairs of frames.

18. Video processing apparatus as claimed in claim 15, characterized in that said means for computing the change in interframe difference value compares the interframe difference for the current first or second pair of frames with the interframe difference for the respective previous first or second pair of frames.

* * * * *